Sept. 22, 1970  G. E. HORNSBY  3,529,849
AIR CUSHION SHOCK ABSORBER FOR VEHICLES
Filed June 26, 1967

INVENTOR.
GUYTON E. HORNSBY
BY John B. Dickman III
AGENT.

United States Patent Office 3,529,849
Patented Sept. 22, 1970

3,529,849
AIR CUSHION SHOCK ABSORBER FOR VEHICLES
Guyton Ellis Hornsby, Annandale, Va.
(P.O. Box 869, Washington, D.C. 20044)
Filed June 26, 1967, Ser. No. 648,608
Int. Cl. B60g 15/08
U.S. Cl. 280—124                    5 Claims

ABSTRACT OF THE DISCLOSURE

A shock absorbing suspension for vehicles, especially motor vehicles, with air being employed as the cushioning component with the air being retained in an inflatable flexible bag disposed within a telescopic cylinder assembly.

---

The present invention generally relates to a suspension assembly for motor vehicles employing air as a cushioning and supporting component which may be easily installed on present day motor vehicles for supporting either the front wheels or rear wheels and serving not only as a shock absorber but also as a load supporting component.

An object of the present invention is to provide a motor vehicle shock absorber and wheel mount incorporating a telescopic cylinder assembly with a confined air bag disposed thereinto cushion and support the vehicle from the wheels.

Another object of the present invention is to provide a wheel mount and shock absorber interconnecting the frame of the motor vehicle and a wheel assembly which is simple in construction, effective in use and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 3:
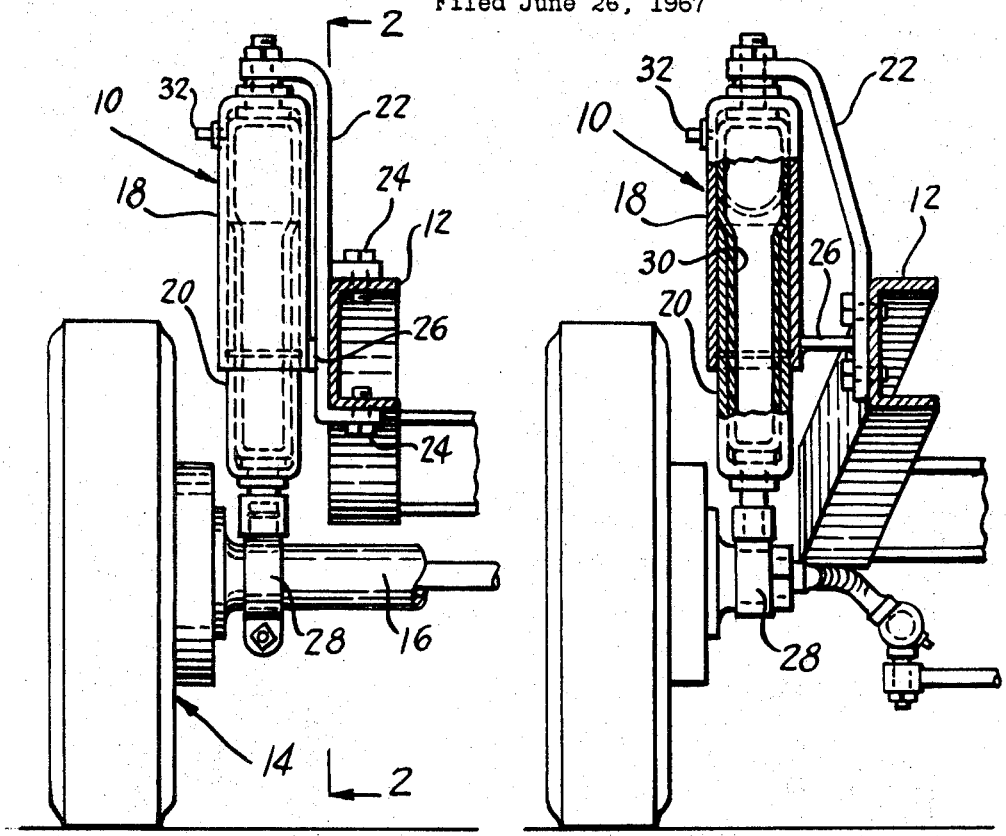
FIG. 1 is a rear elevational view showing the combined shock absorber and wheel mount mounted between the rear axle and frame of a vehicle.
FIG. 3 is a front elevational view partly in section showing the present invention interconnecting the frame and front wheel assembly.
Figure 2:
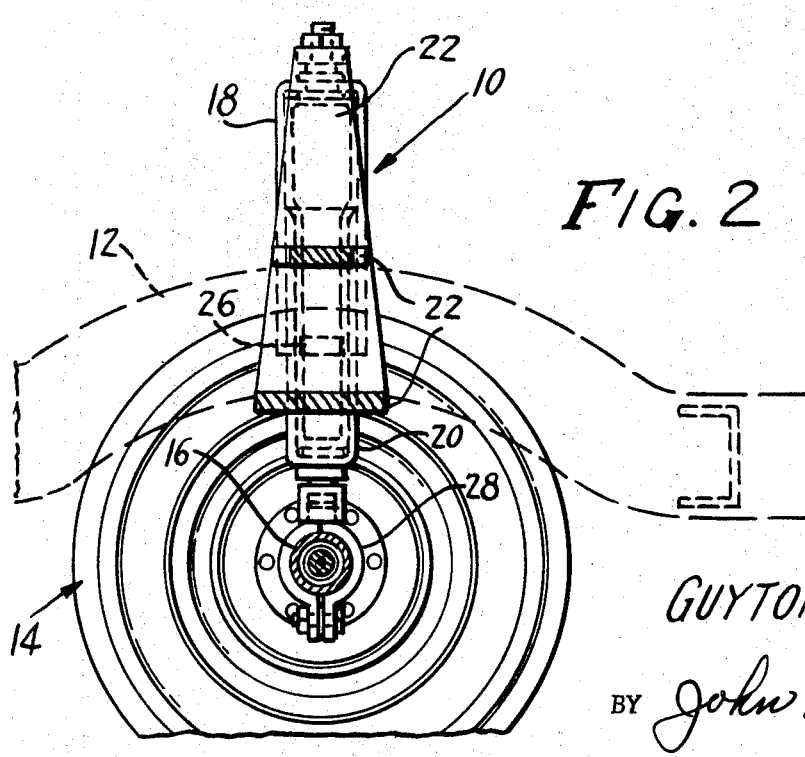
FIG. 2 is a longitudinal vertical sectional view taken on section line 2—2 on FIG. 1.

Referring now to the drawings, the shock absorber and wheel mount is designated as 10 and interconnects vehicle frame or chassis 12 and a rear wheel assembly 14 which is conventional and includes a rear axle housing 16. The shock absorber 10 includes closely fitting telescopic cylinders 18 and 20. The upper cylinder 18 is rigidly affixed to a bracket 22 attached to the frame 12 by bolts 24. A brace 26 interconnects the lower end of the upper cylinder 18 and the bracket 22 thus rigidifying the upper cylinder 18.

The lower cylinder 20 includes a split clamp assembly 28 on the lower end thereof which fixedly secures the lower cylinder 20 to the axle housing 16. Disposed interiorly of and conforming to the cylinders 18 and 20 is an air bag 30 having a valve 32 at the upper end thereof extending through the upper cylinder 18 for inflation and deflation of the air bag 30. The air bag is constructed of flexible rubber-like material capable of repeated flexing without failure and the inflation characteristics of the air bag may be varied to vary the shock absorbing characteristics of the assembly.

The particular details of the mounting brackets and the function thereof are disclosed in more detail in my Pat. No. 3,173,670 issued Mar. 16, 1965. This invention represents major improvements therein by employing an air bag which compresses and expands in response to relative movement of the cylinders.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a shock absorber and wheel mount for motor vehicles having a frame and a wheel assembly in which the shock absorber and wheel mount interconnects the frame and wheel assembly; that improvement comprising a pair of closely fitting hollow telescopic cylinders, means connecting one of said cylinders to the frame, means connecting the other of said cylinders to said wheel assembly, and an air bag disposed within said hollow cylinders and conforming thereto for cushioning and limiting movement thereof.

2. The structure as defined in claim 1 wherein said air bag includes an air valve therein to enable inflation and deflation thereof to vary the cushioning and supporting characteristics thereof.

3. The srtucture as defined in claim 2 wherein said air valve extends outwardly through one of said cylinders.

4. The structure as defined in claim 3 wherein said air bag is flexible and substantially completely fills the interior of said cylinders at all times and is compressible and expandable therewith.

5. The structure as defined in claim 4 wherein said cylinders include means retaining them in assembled condition.

References Cited

UNITED STATES PATENTS

| 1,606,575 | 11/1926 | Hoffman | 267—65 |
| 1,530,043 | 3/1925 | George | 267—65 |
| 1,776,939 | 9/1930 | Udelewitz | 188—88.1 X |

PHILIP GOODMAN, Primary Examiner

U.S. Cl. X.R.
188—88; 267—65